US012746964B2

(12) United States Patent
Marchildon et al.

(10) Patent No.: US 12,746,964 B2
(45) Date of Patent: Sep. 29, 2026

(54) UNIVERSAL WHEEL SYSTEM WITH ADAPTER PLATE

(71) Applicant: KIMPEX INC., Drummondville (CA)

(72) Inventors: Louis-Frédéric Marchildon, Drummondville (CA); Patrick L'Hérault, St-Marjorique de Grantham (CA)

(73) Assignee: KIMPEX INC., Drummondville (CA)

( * ) Notice: Subject to any disclaimer, the term of this patent is extended or adjusted under 35 U.S.C. 154(b) by 291 days.

(21) Appl. No.: 18/533,742

(22) Filed: Dec. 8, 2023

(65) Prior Publication Data

US 2024/0190498 A1 Jun. 13, 2024

Related U.S. Application Data

(60) Provisional application No. 63/386,680, filed on Dec. 9, 2022.

(51) Int. Cl.
*B62B 13/18* (2006.01)
*B62M 27/02* (2006.01)

(52) U.S. Cl.
CPC ............ *B62B 13/18* (2013.01); *B62M 27/02* (2013.01); *B62M 2027/022* (2013.01); *B62M 2027/025* (2013.01)

(58) Field of Classification Search
CPC ............ B62B 13/18; B62M 2027/022; B62M 2027/025
See application file for complete search history.

(56) References Cited

U.S. PATENT DOCUMENTS

| | | | | | | |
|---|---|---|---|---|---|---|
| 12,850 | A | * | 5/1855 | Barber | B62B 13/18 | 280/11 |
| 432,268 | A | * | 7/1890 | Gourlay | B62B 13/18 | 280/9 |
| 750,146 | A | * | 1/1904 | Wolf | B62B 13/18 | 280/11 |
| 1,086,945 | A | * | 2/1914 | Simon | B62B 13/18 | 280/11 |
| 1,134,657 | A | * | 4/1915 | Wisted | B62B 13/18 | 280/11 |
| 1,154,370 | A | * | 9/1915 | Burke | B62B 13/18 | 16/99 |
| 1,280,845 | A | * | 10/1918 | Rieff | B62B 13/18 | 280/11 |

(Continued)

*Primary Examiner* — John Olszewski
(74) *Attorney, Agent, or Firm* — Myers Bigel, P.A.

(57) ABSTRACT

A wheel system for a snowmobile ski provided with an adapter plate secured thereto is provided. The wheel system includes an actuating assembly having a support plate removably connectable to the adapter plate to enable connection and disconnection of the actuating assembly from the adapter plate and from the snowmobile ski. The wheel system also includes an actuator pivotally connectable to the support plate and operable between an idle configuration and an engaged configuration. The wheel system further has a wheel coupled to the actuator and adapted to be positioned in a raised position spaced from a ground surface when operating the actuating assembly in the idle configuration, and a lowered position in engagement with the ground surface when operating the actuating assembly in the engaged configuration.

20 Claims, 15 Drawing Sheets

(56) References Cited

U.S. PATENT DOCUMENTS

| | | | | | |
|---|---|---|---|---|---|
| 1,459,371 | A * | 6/1923 | Kelly | B62B 13/18 | 301/132 |
| 2,433,173 | A * | 12/1947 | Tucker | B62B 13/18 | 280/11 |
| 2,468,271 | A * | 4/1949 | Ostby | B62B 13/18 | 280/31 |
| 10,059,362 | B1 * | 8/2018 | Robillard | B62B 17/02 | |
| 2002/0135141 | A1 * | 9/2002 | Ouellette | B62M 27/02 | 280/43.23 |
| 2003/0222417 | A1 * | 12/2003 | Ouellette | B62M 27/02 | 280/9 |
| 2004/0046338 | A1 * | 3/2004 | Ouellette | B62B 13/18 | 280/9 |
| 2006/0151983 | A1 * | 7/2006 | Despres | B62B 13/18 | 280/767 |
| 2010/0201087 | A1 * | 8/2010 | Beaudoin | B62B 13/18 | 464/179 |
| 2012/0181758 | A1 * | 7/2012 | Lachance | B62B 13/18 | 280/9 |
| 2014/0001718 | A1 * | 1/2014 | Forcier | B62B 13/18 | 280/11 |
| 2015/0123360 | A1 * | 5/2015 | Ouellette | B62B 13/18 | 280/9 |

* cited by examiner

UNIVERSAL WHEEL SYSTEM WITH ADAPTER PLATE

CROSS-REFERENCE TO RELATED APPLICATIONS

This application claims priority under 35 USC § 119(e) of U.S. Provisional Application No. 63/386,680, filed Dec. 9, 2022, entitled "UNIVERSAL WHEEL SYSTEM WITH ADAPTER PLATE", the entirety of which is hereby incorporated by reference.

TECHNICAL FIELD

The technical field generally relates to a wheel system for snowmobiles, and more specifically to a wheel system having a universal adapter plate enabling connection of the wheel system to a snowmobile ski.

BACKGROUND

Wheel systems can be installed and/or attached to snowmobile skis, allowing for lifting the skis off the ground and moving the snowmobile around on the wheels to prevent prematurely damaging or wearing down the skis, for example. Known wheel systems are usually provided as one-piece devices mounted to the skis using snowmobile-specific or ski-specific mounting systems. Therefore, versatility of those wheel systems can be low as each ski brand/type needs a specific wheel system. In other words, known wheel systems are not interchangeable or adaptable to other skis than those for which they were manufactured.

Therefore, there is a need for an improved wheel system that at least mitigates some of the known issues from existing wheel systems.

SUMMARY

According to an aspect of the present disclosure, a wheel system for a snowmobile ski is provided. The wheel system includes an adapter plate adapted to be secured to the ski; an actuating assembly including a support plate removably connectable to the adapter plate to enable connection and disconnection of the actuating assembly from the adapter plate and the ski; and an actuator pivotally connectable to the support plate and being operable between an idle configuration and an engaged configuration; and a wheel coupled to the actuator and adapted to be positioned in a raised position spaced from a ground surface when operating the actuating assembly in the idle configuration, and a lowered position in engagement with the ground surface when operating the actuating assembly in the engaged configuration.

According to a possible embodiment, the support plate includes a cut-out section defining an opening through the support plate, and the adapter plate comprises a connector hole, and wherein the support plate is removably connectable to the adapter plate via a connector adapted to extend through the opening and engage the connector hole.

According to a possible embodiment, the connector hole comprises at least two connector holes, and wherein the position of the support plate relative to the adapter plate is adjustable by aligning the opening of the cut-out section with any one of the at least two connector holes.

According to a possible embodiment, the opening defines a plurality of connector-receiving openings, and wherein the position of the support plate relative to the adapter plate is adjustable by aligning any one of the plurality of connector-receiving openings with the connector hole.

According to a possible embodiment, the position of the support plate relative to the adapter plate is adjustable in a plurality of positions, and wherein a number of positions corresponds to a number of possible combinations to align one of the plurality of connector-receiving openings with one of the at least two connector holes.

According to a possible embodiment, the at least two connector holes are axially aligned with one another to enable adjustment of the position of the support plate relative to the adapter plate in a first axial direction.

According to a possible embodiment, the connector-receiving openings are axially aligned with one another to enable adjustment of the position of the support plate relative to the adapter plate in a second axial direction.

According to a possible embodiment, the first axial direction and the second axial direction are transverse to enable adjustment of the position of the support plate relative to the adapter plate in two different directions.

According to a possible embodiment, the first axial direction is perpendicular relative to the second axial direction.

According to a possible embodiment, each one of the plurality of connector-receiving openings at least partially overlays another one of the plurality of connector-receiving openings.

According to a possible embodiment, the at least two connector holes are spaced apart from one another across a surface of the adapter plate.

According to a possible embodiment, the connector is configured to define a first connection point, and wherein the wheel system further comprises a secondary connector configured to further secure the support plate to the adapter plate and define a second connection point spaced from the first connection point.

According to a possible embodiment, the support plate comprises a pin hole, and the adapter plate comprises a pin-receiving hole, and wherein the secondary connector comprises a pin adapted to extend through the pin hole and engage the pin-receiving hole.

According to a possible embodiment, the support plate comprises a plurality of pin holes, and wherein any one of the plurality of pin holes is adapted to be aligned with the pin-receiving hole when securing the support plate to the adapter plate.

According to a possible embodiment, the number of pin holes correspond to the number of possible combinations to align one of the plurality of connector-receiving openings with one of the at least two connector holes.

According to a possible embodiment, the secondary connector comprises at least two pins, and wherein each one of the at least two pins comprises a respective plurality of pin holes.

According to a possible embodiment, the opening includes an edge portion, and wherein the connector includes a complementarily-shaped portion relative to the edge portion adapted to engage same.

According to a possible embodiment, the adapter plate is securable to a side surface of the ski.

According to a possible embodiment, the adapter plate is securable to an inner side surface of the ski.

According to a possible embodiment, the ski is coupled to the snowmobile via a bolt, and wherein the adapter plate is securable to the ski at least via the bolt.

According to a possible embodiment, the adapter plate is a left-side adapter plate adapted to be secured to a left-side ski of the snowmobile, and the actuating assembly is a left-side actuating assembly removably connectable to the left-side adapter plate, and wherein the wheel system further comprises a right-side adapter plate adapted to be secured to a right-side ski of the snowmobile; and a right-side actuating assembly removably connectable to the right-side adapter plate.

According to a possible embodiment, the left-side adapter plate is a mirror of the right-side adapter plate.

According to a possible embodiment, the left-side actuating assembly is a mirror of the right-side actuating assembly.

According to another aspect, a wheel system for a snowmobile ski provided with an adapter plate secured to the ski is provided. The wheel system includes an actuating assembly comprising a support plate removably connectable to the adapter plate to enable connection and disconnection of the actuating assembly from the adapter plate and the ski; and an actuator pivotally connectable to the support plate and being operable between an idle configuration and an engaged configuration; and a wheel coupled to the actuator and adapted to be positioned in a raised position spaced from a ground surface when operating the actuating assembly in the idle configuration, and a lowered position in engagement with the ground surface when operating the actuating assembly in the engaged configuration.

According to another aspect, a snowmobile having a pair of skis provided with respective wheel systems as defined above is provided.

According to another aspect, a wheel system for a snowmobile ski is provided. The wheel system includes an adapter plate adapted to be secured to the ski; an actuating assembly comprising a support plate connectable to the adapter plate; and an actuator pivotally connectable to the support plate and being operable between an idle configuration and an engaged configuration; and a wheel coupled to the actuator and adapted to be positioned in a raised position spaced from a ground surface when operating the actuating assembly in the idle configuration, and a lowered position in engagement with the ground surface when operating the actuating assembly in the engaged configuration, wherein the support plate is adjustably coupled to the adapter plate via a connecting element, thereby enabling adjustment of a position of the support plate, the actuator and the wheel relative to the adapter plate and the ski in at least one direction prior to connecting the support plate to the adapter plate.

According to a possible embodiment, the support plate is removably connectable to the adapter plate to enable connection and disconnection of the actuating assembly from the adapter plate and the ski.

According to a possible embodiment, the connecting element comprises one or more fasteners adapted to extend through the support plate and engage the adapter plate to secure the support plate to the adapter plate in a desired position.

According to a possible embodiment, the desired position of the support plate includes a desired distance between the wheel and the ground surface.

According to a possible embodiment, the support plate comprises a plurality of fastener holes and the adapter plate comprises one or more fastener-receiving holes, and wherein the support plate is indexable relative to the adapter plate via alignment of any one of the fastener holes with any one of the one or more fastener-receiving holes to enable the adjustment of the position of the support plate.

According to a possible embodiment, the support plate comprises one or more fastener holes and the adapter plate comprises a plurality of fastener-receiving holes, and wherein the support plate is indexable relative to the adapter plate via alignment of any one of the one or more fastener holes with any one of the fastener-receiving holes to enable the adjustment of the position of the support plate.

According to another aspect, a snowmobile ski having a wheel system as defined above is provided.

According to another aspect, a kit comprising a ski-specific component configured to fit on a snowmobile ski, and a generic component configured to be removably connected to the ski-specific component is provided.

According to a possible embodiment, the ski-specific component comprises the adapter plate of the wheel system as defined above, and wherein the generic component comprises the actuation assembly and the wheel of the wheel system as defined above.

According to another aspect, a kit for a snowmobile comprising a snowmobile ski, a ski-specific component configured to fit on the snowmobile ski, and a generic component configured to be removably connected to the ski-specific component is provided.

According to another aspect, an adapter plate for a snowmobile ski for enabling adjustment of an accessory system comprising a support plate and an accessory is provided. The adapter plate includes an adapter plate body connectable to the snowmobile ski, the adapter plate body having an engagement element enabling indexation of the support plate upon the adapter plate body to adjust a position of the accessory relative to the ski and/or a ground surface.

According to a possible embodiment, the adapter plate body is removably connectable to the snowmobile ski.

According to a possible embodiment, the adapter plate body is integrally formed with the snowmobile ski.

According to a possible embodiment, the engagement element comprises a plurality of openings, and wherein a portion of the support plate is adapted to be aligned with any one of the plurality of openings to enable connecting the support plate to the adapter plate body.

According to a possible embodiment, the engagement element comprises a slot configured to enable slidably connecting the support plate to the adapter plate body.

According to a possible embodiment, the accessory comprises at least one of a wheel, an ice scratcher and a tow bar.

According to a possible embodiment, the accessory system comprises an actuator operable to enable movement of the accessory.

According to another aspect, a wheel system for a snowmobile ski of a snowmobile is provided. The wheel system includes an adapter plate adapted to be secured to the ski, an actuating assembly and a wheel. The actuating assembly includes a support plate connectable to the adapter plate and an actuator pivotally connectable to the support plate and operable between an idle configuration and an engaged configuration. The wheel being coupled to the actuator and adapted to be positioned in a raised position spaced from a ground surface when operating the actuating assembly in the idle configuration, and a lowered position in engagement with the ground surface when operating the actuating assembly in the engaged configuration. The snowmobile ski is connected to the snowmobile via a bolt, and the bolt and the adapter plate are integrally formed as a single piece.

According to a possible embodiment, the wheel system further includes a sleeve removably slidable onto the bolt to increase an outer diameter thereof.

According to a possible embodiment, the adapter plate has a rear surface with at least a portion thereof being complementarily-shaped relative to outer contours of the ski to increase conformity of the adapter plate to the ski.

DETAILED DESCRIPTION

Figure 1:
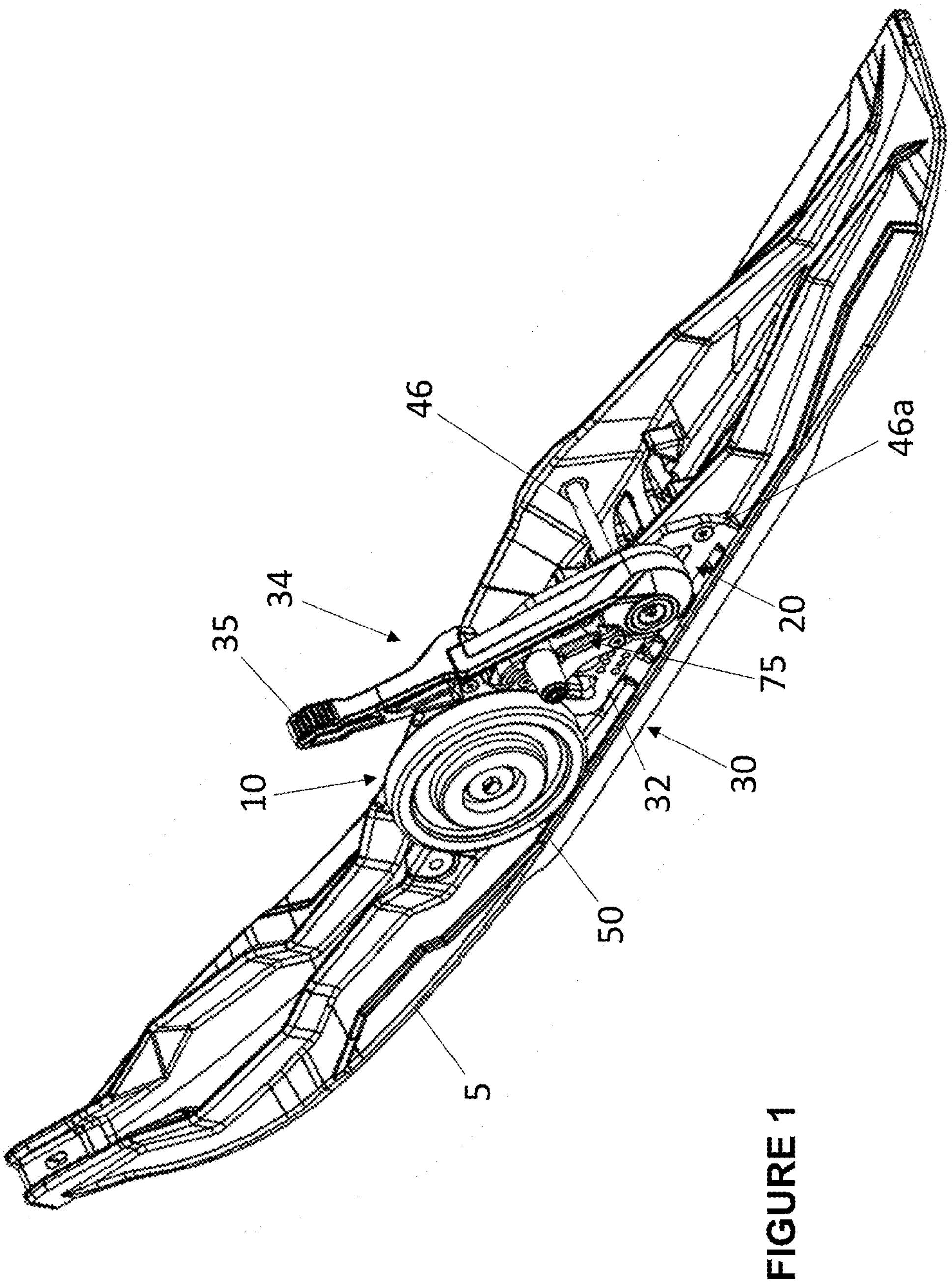
FIG. 1 is a perspective view of a snowmobile ski provided with a wheel system comprising an actuating assembly connected to the snowmobile ski, according to an embodiment.

As will be described herein in relation with various embodiments, an adaptive or "universal" system for connecting accessories to a snowmobile, such as to a snowmobile ski, is provided. The adaptive system can be configured to be used in combination with a wheel, for example, defining a adaptive wheel system. The wheel system generally includes an adapter plate configured to be secured to a ski of the snowmobile, an actuating assembly connectable to the adapter plate and a wheel operatively connected to the actuating assembly. The actuating assembly is operable between an idle, retracted or stowed configuration, where the wheel is elevated and therefore spaced from a ground surface, and an engaged or deployed configuration, where the wheel engages the ground surface and is positioned to lift the ski from the ground to enable travelling on the wheel.

In some embodiments, the adapter plate facilitates connection and disconnection of an accessory, such as the actuating assembly, to the ski of the snowmobile. The adapter plate is configured to remain connected to the ski while the accessory is disconnected for maintenance, for interchanging with another accessory or simply for removal. It is noted that the adapter plate can be versatile or "universal" and configured to cooperate with a plurality of accessories and enable selective connection thereof to the snowmobile.

In some embodiments, the actuating assembly also includes a support plate removably connectable to the adapter plate to facilitate connection and disconnection of the actuating assembly from the ski. For example, the actuating assembly can be disconnected from the ski before riding through loose snow. It should be appreciated that, when disconnecting the actuating assembly from the ski, the adapter plate can remain secured to the ski. The adapter plate may be configured to fit and/or be secured to a limited number of skis, such as a particular brand and/or type of ski. However, the actuating assembly is configured to be connected to the adapter plate, thereby increasing portability of the attached accessory (e.g., the wheel system) from one snowmobile to another since the accessory does not require redesigns or updates in order to adapt and/or properly fit with a new snowmobile, as only the adapter plate may need modifications. In one embodiment, a pair of left and right wheel systems are respectively secured to left and right skis of a snowmobile. Left and right actuating assemblies can be operated in the engaged configuration such that each ski of the snowmobile is lifted from the ground, allowing for moving the snowmobile around with the wheels and avoiding wearing out or damaging the skis.

Referring to FIGS. 1 to 4B, a wheel system 10 for a snowmobile ski 5 is shown in accordance with a possible embodiment. The wheel system 10 includes an adapter plate 20 adapted to be secured to the ski 5, an actuating assembly 30 connectable to the adapter plate 20, and a wheel 50 operatively coupled to the actuating assembly 30. The actuating assembly 30 is operable in an idle configuration (seen in FIG. 4A), where the wheel is raised, or elevated off the ground surface, and in an engaged configuration (seen in FIG. 4B), where the wheel 50 is positioned to be in contact, or in engagement with the ground surface. As will be described further below, operation of the actuating assembly in the engaged configuration enables the wheel to engage and push against the ground in order to lift the ski 5 off the ground, thereby enabling travelling on the wheel instead of the ski.

In this embodiment, the actuating assembly 30 includes a support plate 32 adapted to be removably connected to the adapter plate 20. The actuating assembly 30 can therefore be selectively connected to and disconnected from the adapter plate 20, and thereby from the ski 5 of the snowmobile. For example, in loose snow or on snow-covered terrain, the wheel system may be superfluous, and a user (e.g., a rider of the snowmobile) can choose to disconnect the actuating assembly 30 from the adapter plate 20.

Figure 5A:
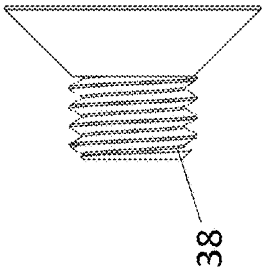
FIG. 5A is an enlarged view of a connector used to connect the support plate to the adapter plate, according to an embodiment.
Figure 5:
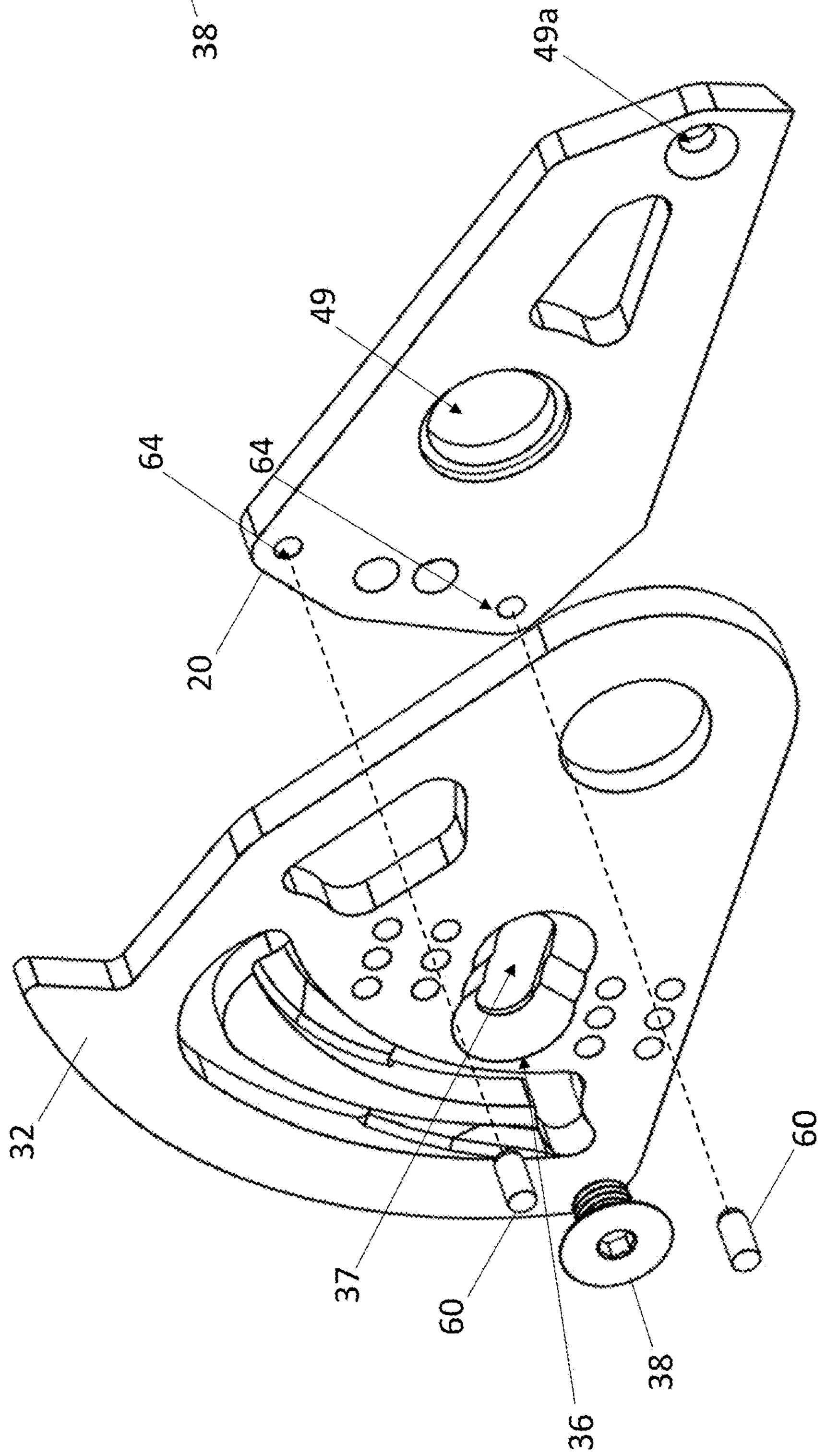
FIG. 5 is an exploded view of a portion of the actuating assembly, showing a support plate connectable to the adapter plate, according to an embodiment.

With reference to FIG. 5, in addition to FIGS. 1 to 4*b*, the adapter plate 20 can be connected to the ski 5 using any suitable fastening method, such as using one or more mechanical fasteners, for instance. In this embodiment, the adapter plate 20 includes a fastener aperture 49 shaped and adapted to receive a fastener therein for connecting to the ski. The fastener can include a bolt 46, such as the bolt used to connect the forward arms, or spindles of the snowmobile to the ski 5. In some embodiments, the bolt 46 is provided with the snowmobile (i.e., the fastener is an existing fastener or structural feature of the snowmobile), and the adapter plate 20 is adapted to fit and/or cooperate with the bolt 46. However, in some embodiments, the wheel system 10 may include a modified bolt adapted for securing the adapter plate 20 to a ski, thereby replacing the bolt provided with the snowmobile. For example, a modified bolt may have an extended length, or a securing end for securing the adapter plate 20 to the ski 5.

The adapter plate 20 can be further secured to the ski via at least one additional fastener 46*a* extending through a corresponding additional aperture 49*a*. It is appreciated that using at least two (2) fasteners (e.g., the bolt 46 and the additional fastener 46*a*) further secures the adapter plate in position by preventing axial and rotational movement thereof relative to the ski. The additional fastener 46*a* can include, without being limited to, one or more bolts and/or screws fitting the additional aperture(s) 49*a* and being secured onto the ski 5.

Figure 3:
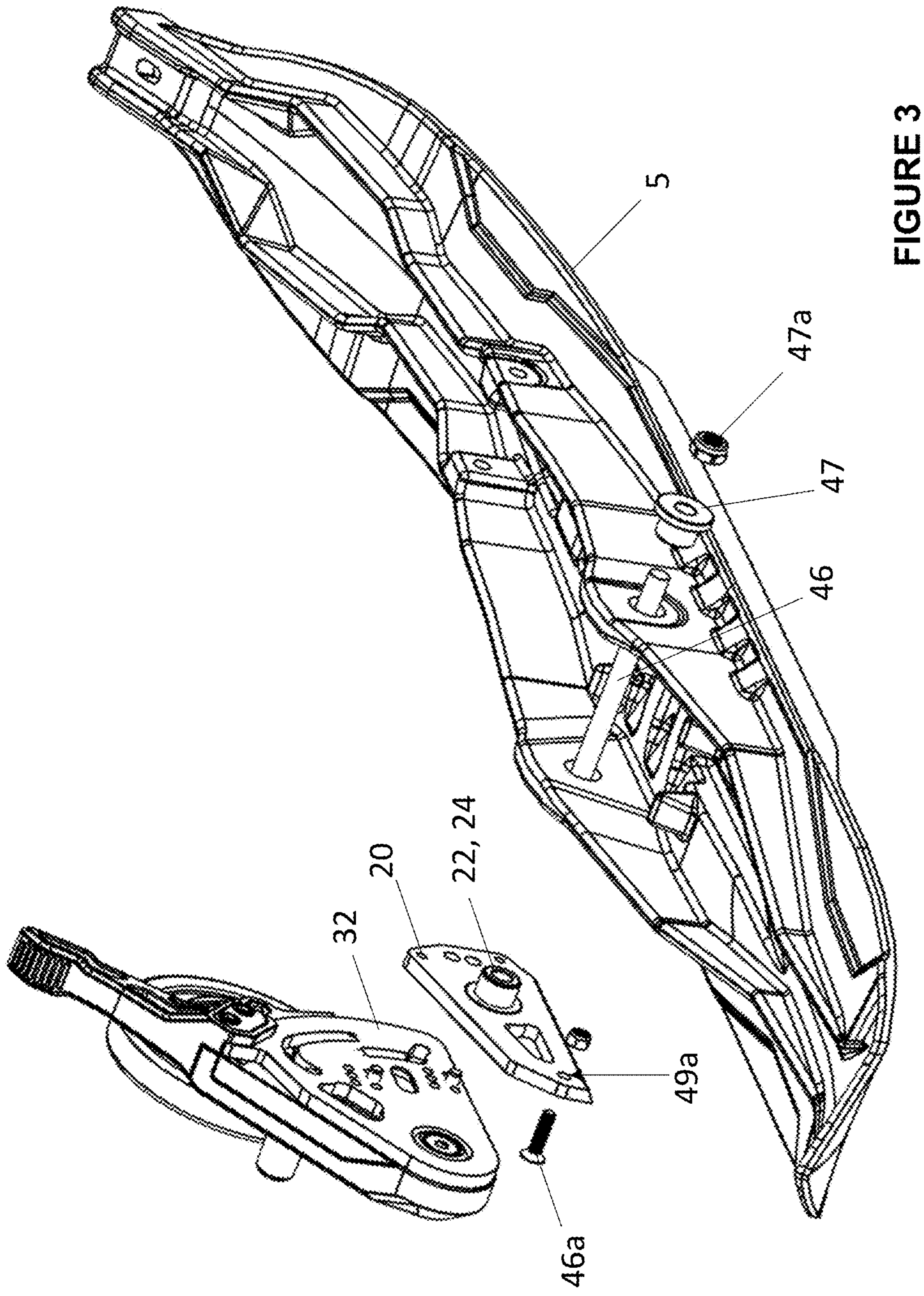
FIG. 3 is an exploded perspective view of the snowmobile ski shown in FIG. 2, showing an attachment extending from the adapter plate for engaging a bolt of the ski, according to an embodiment.
Figure 4A:
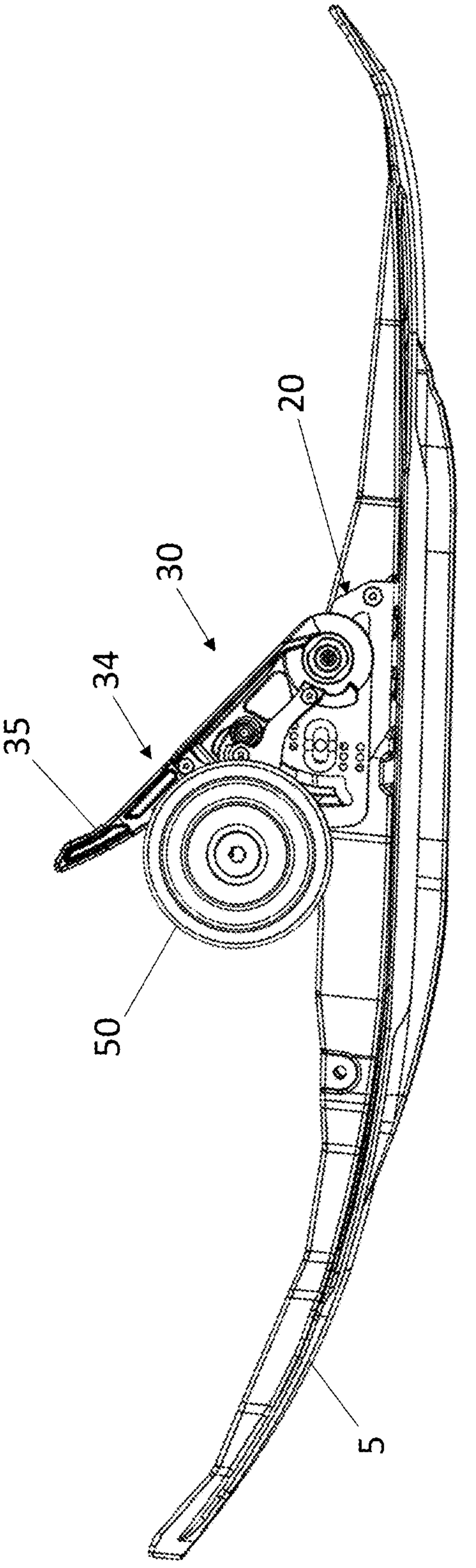
FIG. 4*a* is a side elevation view of the snowmobile ski shown in FIG. 1, showing the actuating assembly in an idle configuration and a wheel in an elevated position, according to an embodiment.
Figure 4B:
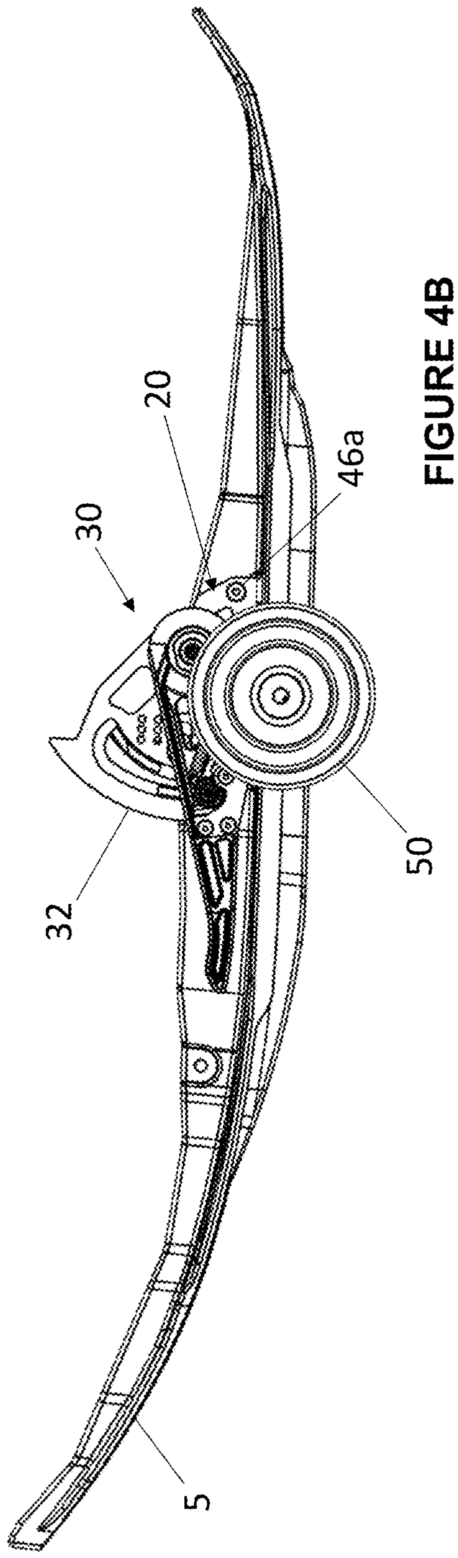
FIG. 4*b* is a side elevation view of the snowmobile ski shown in FIG. 1, showing the actuating assembly in an engaged configuration and the wheel in an engaged position, according to an embodiment.

Typically, the bolt 46 is fitted to the ski 5 via a pair of flanged bushings 47 (as seen in FIG. 3) and respective nuts 47*a*. The pair of bushings and nuts engage respective ends of the bolt 46 for securing it to the ski. In some embodiments, the adapter plate 20 includes an attachment 22 configured to engage the bolt 46 in a similar fashion as known flanged bushings 47, for example. The attachment 22 can be adapted to cooperate with existing bushings 47, or configured to replace at least one of the pair of bushings 47. In this embodiment, the attachment 22 corresponds to a bushing attachment 24 connected to the adapter plate 20 and extending therefrom to engage a corresponding end of the bolt 46. More specifically, the bushing attachment 24 is shaped and sized to extend through the fastener aperture 49, and is adapted to be connected to the adapter plate with a portion extending therefrom. In some embodiments, the bushing attachment 24 includes a flanged edge adapted to engage a surface of the adapter plate. Alternatively, or additionally, the bushing attachment 24 is secured to the adapter plate 20, for example, by press-fitting, welding and/or screwing the bushing attachment 24 in the fastener aperture 49. However, it is appreciated that other configurations of the bushing attachment are possible for connecting the adapter plate to the ski. For example, the attachment 22 can be integrally formed with the adapter plate by machining the attachment together with the adapter plate, or molding the adapter plate with the integrated attachment.

Figure 2:
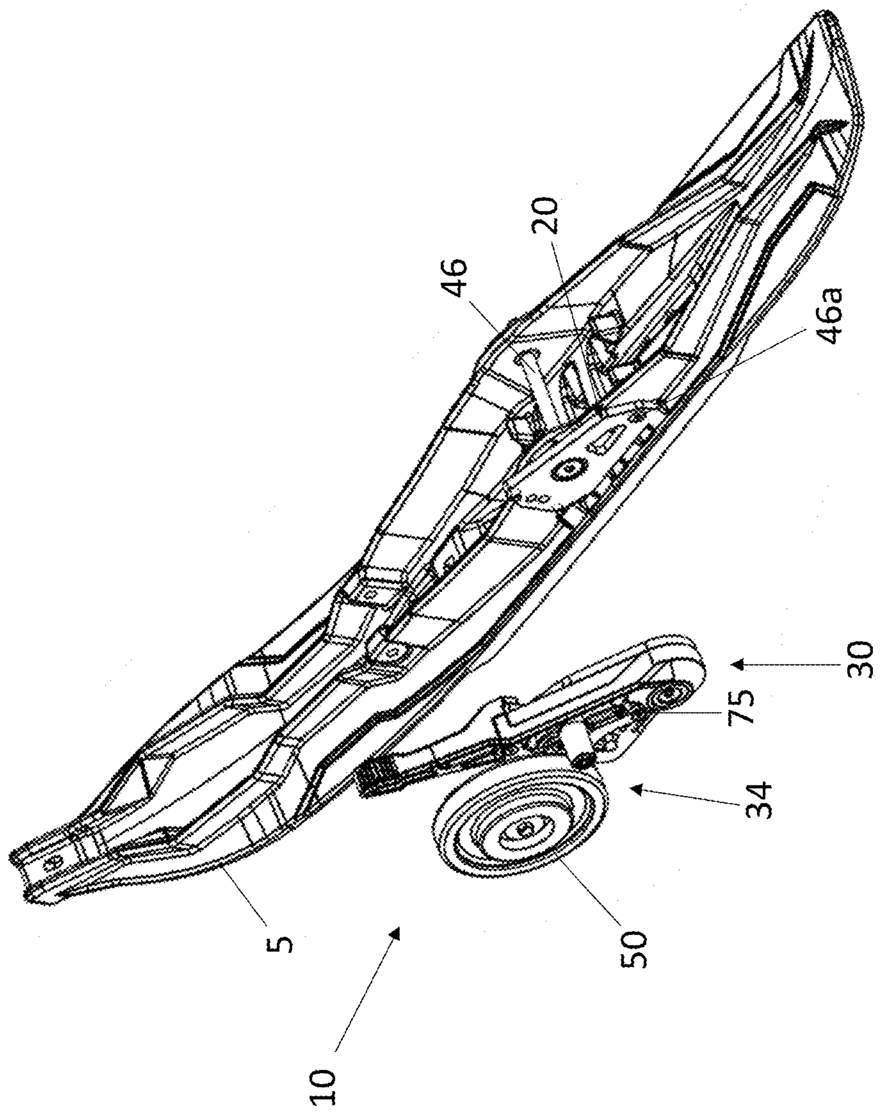
FIG. 2 is a partially exploded perspective view of the snowmobile ski shown in FIG. 1, showing an adapter plate secured to the snowmobile ski and the actuating assembly disconnected from the adapter plate, according to an embodiment.

As can be seen in FIGS. 1 and 2, the adapter plate 20 is securable to a side surface of the ski 5, e.g., in general alignment with the bolt 46 of the snowmobile spindle. In some embodiments, the adapter plate 20 can be adapted to be secured to an inner side surface of the ski 5, where the inner side surface corresponds to a side surface facing an opposite ski of the snowmobile. However, it is appreciated that the adapter plate 20 can be adapted to be secured on the outer side surface of the ski 5, opposite the inner side surface, or any other suitable surface of the ski, depending on the geometry of the ski and/or of the snowmobile, for example. Further, some embodiments may not include the fastener aperture 49, and the adapter plate 20 may therefore not need be in alignment with the bolt 46. For example, the adapter plate 20 can be integrally formed with the ski, among other possibilities.

In the illustrated embodiments, the actuating assembly 30 includes an actuator 34 that is movably (e.g., pivotally) connectable to the support plate 32 and operable to operate the actuating assembly 30 between at least the idle configuration and the engaged configuration. The idle configuration can be suitable when riding on the skis is desired, such as in snow-covered terrain, for example. On the other hand, operating the actuating assembly 30 in the engaged configuration positions the wheel 50 in a deployed position, in contact with the ground surface. The deployed position of the wheel can include positioning a portion of the wheel vertically lower than the ski such that the ski is lifted off the ground, and the snowmobile can be ridden on the wheels (e.g., when both wheel systems are operated in the engaged configuration).

Figure 6:
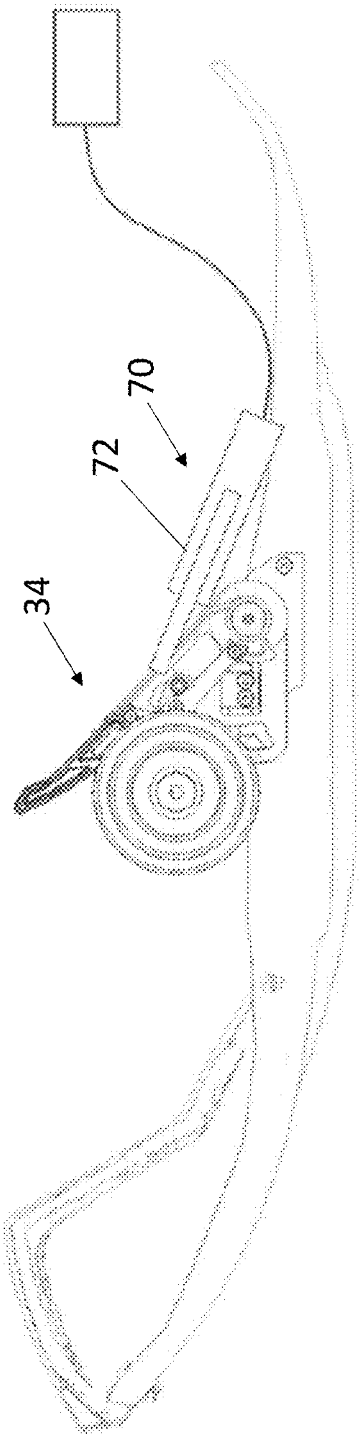
FIGS. 6 and 7 are side elevation views of the snowmobile ski shown in FIG. 1, showing an automated actuating system configured to enable remote operation of the actuating assembly, according to a possible embodiment.
Figure 7:
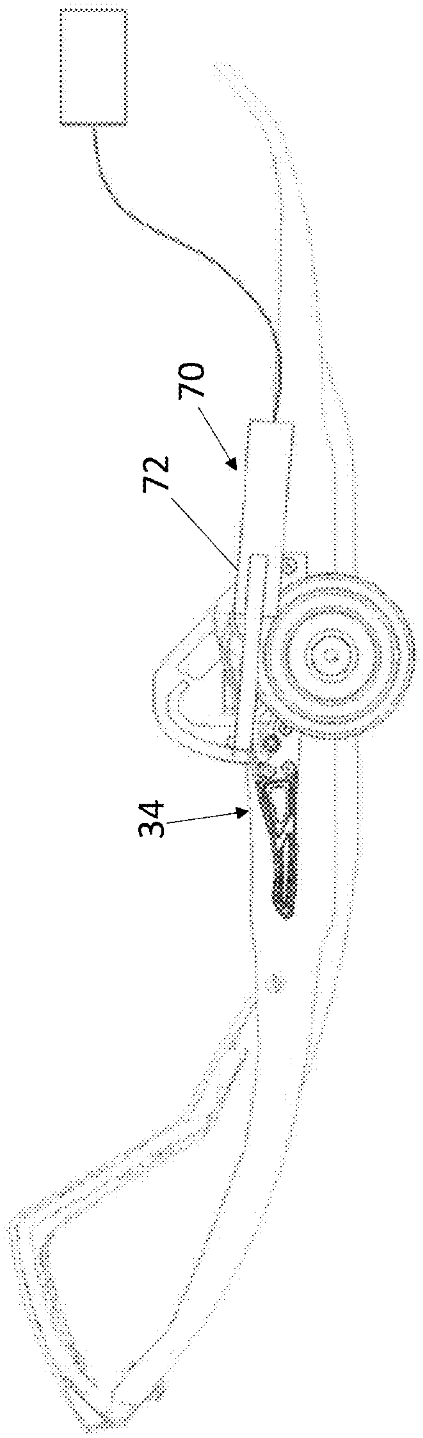

Still referring to FIGS. 1 to 4B, in this embodiment, the actuator 34 includes a lever or a pedal 35 that allows a user to operate the actuating assembly 30 from the idle configuration to the engaged configuration. It is thus noted that the actuator 34 can be adapted to enable manual operation thereof, e.g., with a hand or a foot. It will be appreciated that the actuator 34 may alternatively, or additionally, be provided with a mechanical device 70 configured and/or operable for automated control of the actuating assembly 30. For example, and as seen in FIGS. 6 and 7, the mechanical device 70 can include an electrical or hydraulic actuator 72 operable to engage the actuator 34 and operate the actuating assembly in the desired configuration. Therefore, it is noted that the mechanical device 70 foregoes the need for the user's manual force to operate the actuating assembly 30, without necessarily preventing manual operation o the actuator, if desired.

In such embodiments, additional components may be needed to activate the mechanical device, such as device actuators, controllers, a power source, limit switches and/or buttons, for example. Such components may be provided so that both left and right actuating assemblies, respectively connected to left and right skis, are simultaneously operated in the engaged configuration. In some embodiments, the actuator 34 may also be adapted to enable operating the actuating assembly 30 from the engaged configuration to the idle configuration, for retracting the wheel and re-engaging the ski with the ground surface. However, in this embodiment, the actuating assembly is provided with a retracting mechanism adapted to automatically operate the actuating assembly in the idle configuration, from the engaged configuration. For example, the retracting mechanism can generate a retracting force to bias the actuating assembly back in the idle configuration, thus moving the wheels back in the elevated position when weight is removed from the wheel 50, for example. In some embodiments, the retracting mechanism can include a spring-loaded mechanism 75, for example, and among other possibilities.

With reference to FIGS. 5, 5A, 8 and 9, in addition to FIGS. 1 to 4, the support plate 32 of the actuating assembly 30 is removably connectable to the adapter plate 20 and is adapted to facilitate connection and disconnection of the actuating assembly 30 to and from the adapter plate 20. It is therefore noted that the support plate 32 can facilitate connection and disconnection of the actuating assembly (and the wheel) to and from the ski 5. In addition, and as will be described further below, the support plate 32 can be adjustably connected to the adapter plate 20 to enable connection of the support plate 32 in a plurality of positions and enable adjustment of the position of the support plate relative to the adapter plate. In this embodiment, the support plate 32 includes a cut-out section 36 defining an opening 37 adapted for receiving a connecting element 38. The connecting element 38 is at least partially inserted through the opening 37 and secured to the adapter plate 20 such that the support plate 32 is connected with the adapter plate 20.

In this embodiment, the cut-out section 36 includes edges 40 complementarily shaped with respect to a portion of the connector 38. Therefore, the connector can fit snugly within the opening 37 and have a portion thereof abut the corresponding edge 40. As seen in FIG. 5A, the connector 38 can include a bolt having a head portion shaped and sized to sit on the complementarily shaped edge 40. For example, the head portion can be flanged, or cone-shaped, and the edges 40 surrounding the opening 37 can be tapered and adapted to receive the head portion thereon. The head portion can be made to engage the cut-out section 36 to be "flush" with an outer surface of the support plate 32, for example. It is noted that the edges 40 can be adapted to prevent the connecting element 38 from completely traversing through the opening 37 and thus enable securing/fastening the support plate to the adapter plate.

Still with reference to FIGS. 5, 5A, 8 and 9, the support plate 32 can be coupled to the adapter plate 20 in a plurality of positions. In this embodiment, the opening 37 of the cut-out section 36 includes three (3) connector-receiving openings 37*a*, 37*b*, 37*c* defined adjacent one another. As illustrated, each connector-receiving opening includes edges 40 shaped and adapted to receive the connector 38 in respective positions. Therefore, it is noted that the connector can extend through the support plate in at least three (3) different locations, enabling connection with the adapter plate in three (3) corresponding configurations. More specifically, in this embodiment, the adapter plate 20 can include a connector hole 48 configured to receive the connector 38 when fastening the support plate to the adapter plate. The position of the support plate 32 relative to the adapter plate can therefore be adjusted depending on the connector-receiving opening chosen.

In this embodiment, the connector-receiving openings 37*a*, 37*b*, 37*c* are defined adjacent one another and at least partially overlay each other. In addition, the connector-receiving openings are illustratively provided in a line such that adjustment of the support plate relative to the adapter plate can be accomplished in a first axial direction. However, it is appreciated that other configurations are possible and can be used. For example, the support plate can include any other number of connector-receiving openings positioned at any suitable location on the support plate and/or relative to one another to allow additional possible positions of the support plate on the adapter plate. In some embodiments, the adapter plate 20 includes additional connector holes 48 adapted to receive the connector 38 when fastening the support plate to the adapter plate. Therefore, the position of the support plate 32 relative to the adapter plate 20 can be adjusted based on: 1) the chosen connector-receiving opening; and 2) the chosen connector hole 48.

Figure 8:
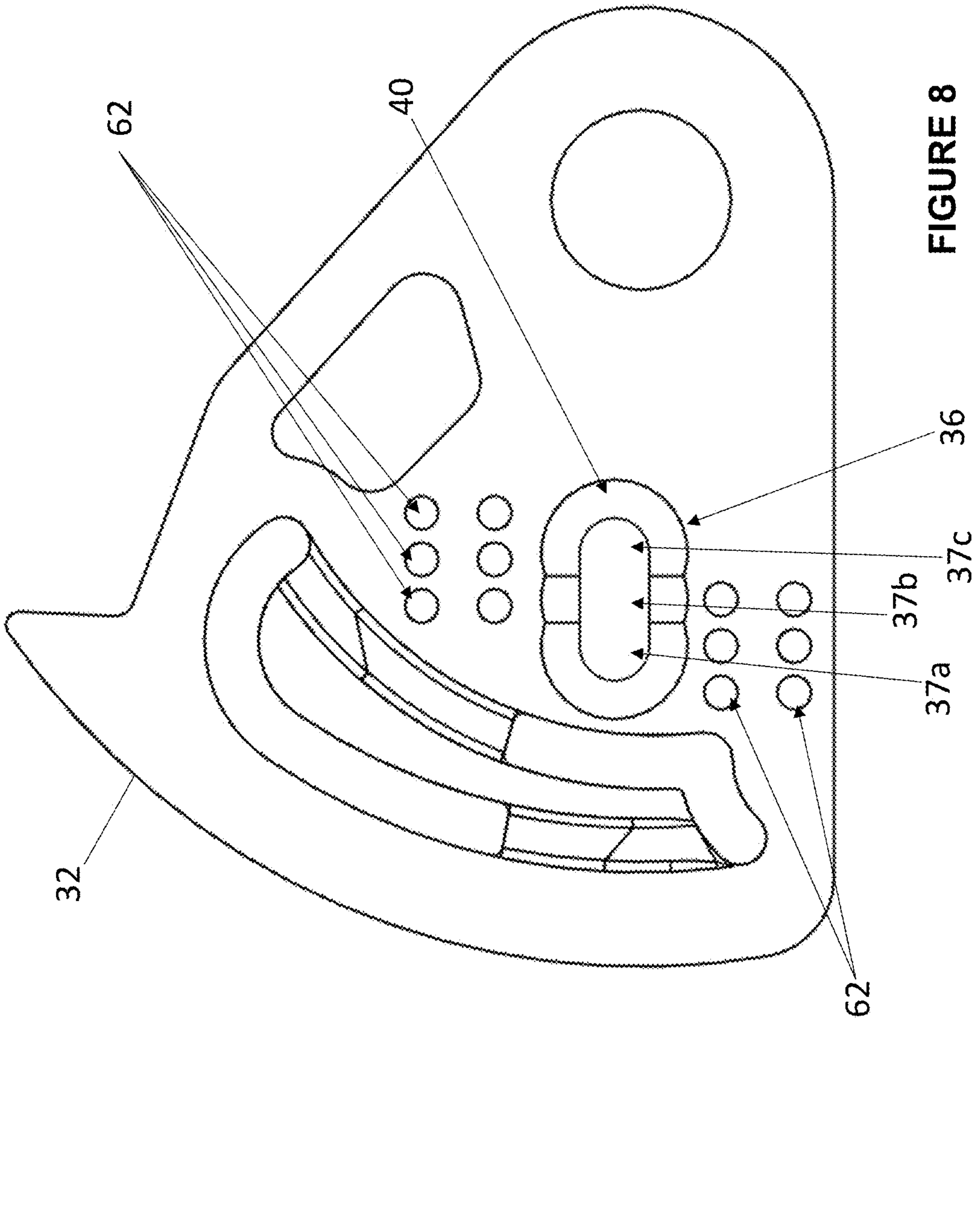
FIG. 8 is a front view of the support plate of the actuating assembly, showing a cut-out section defining an opening and a plurality of pin holes, according to an embodiment.
Figure 9:
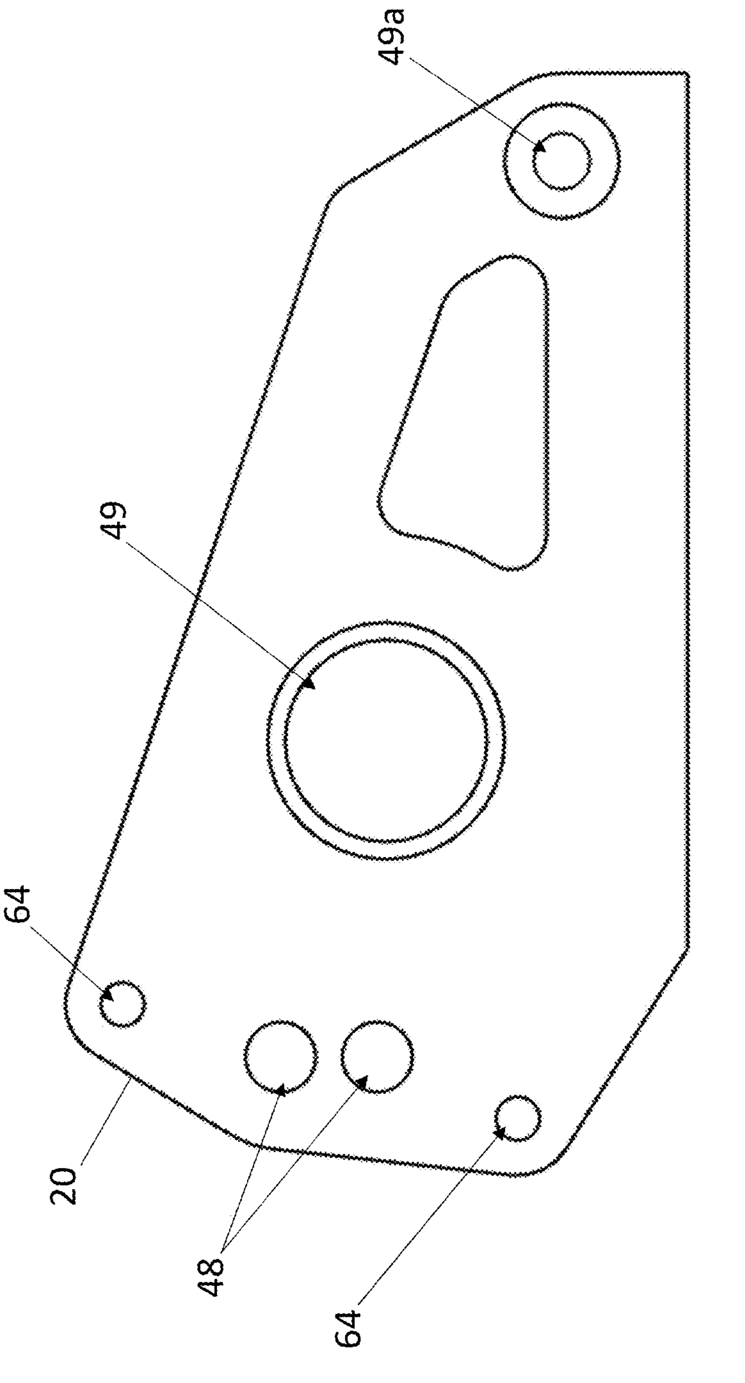
FIG. 9 is a front view of the adapter plate, showing a fastener opening defined generally in a center thereof, and a pair of pin-receiving holes, according to an embodiment.
Figure 10:
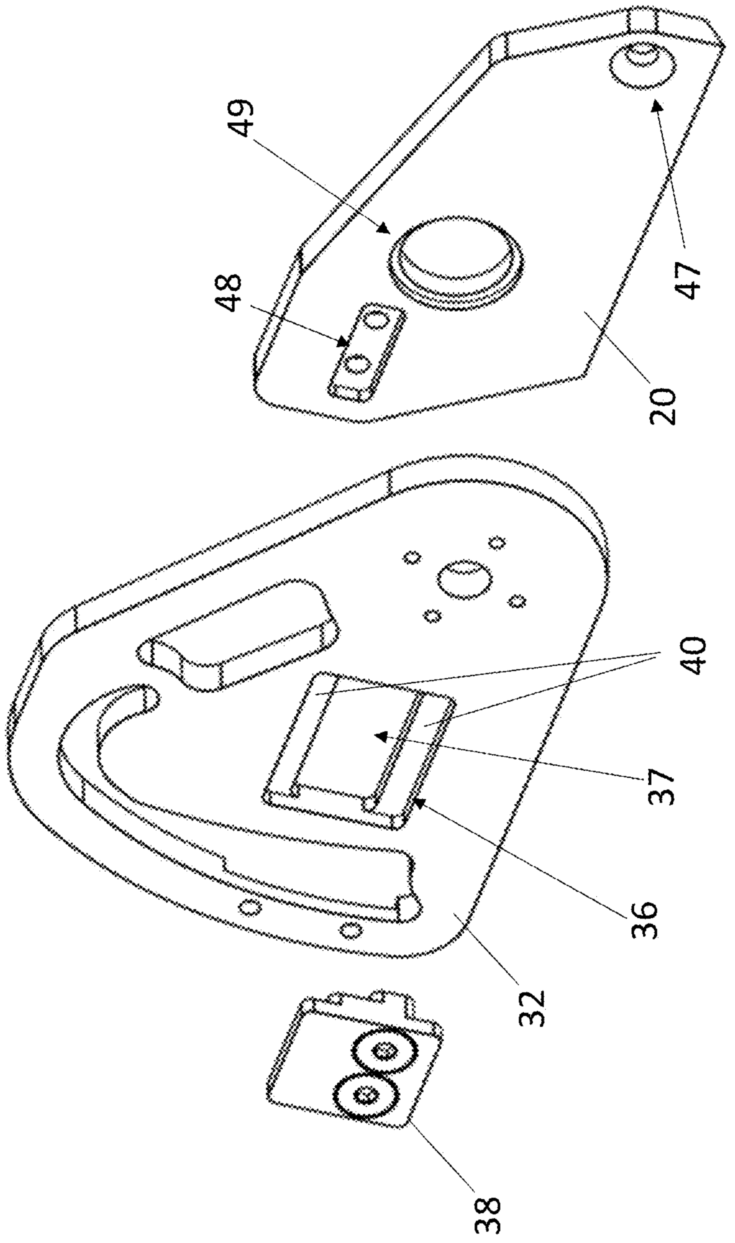
FIG. 10 is an exploded view of an alternate embodiment of the actuating assembly, showing a support plate connectable to the adapter plate.
Figure 12:
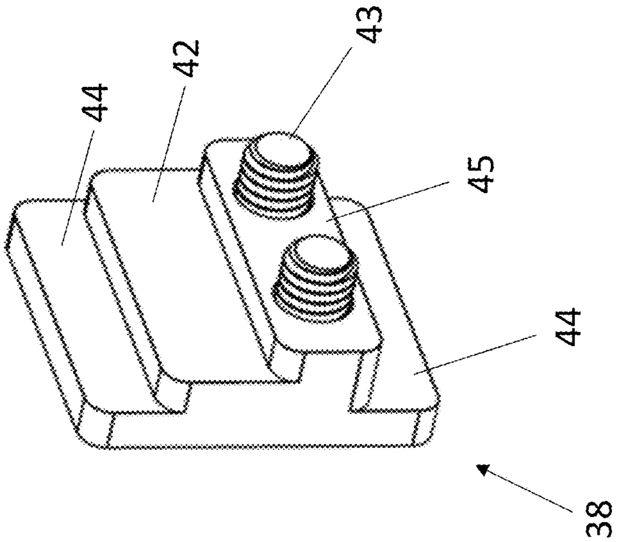
FIGS. 11 and 12 are perspective views of an alternate embodiment of a connector adapted to connect the support plate and the adapter plate shown in FIG. 10 together.
Figure 11:
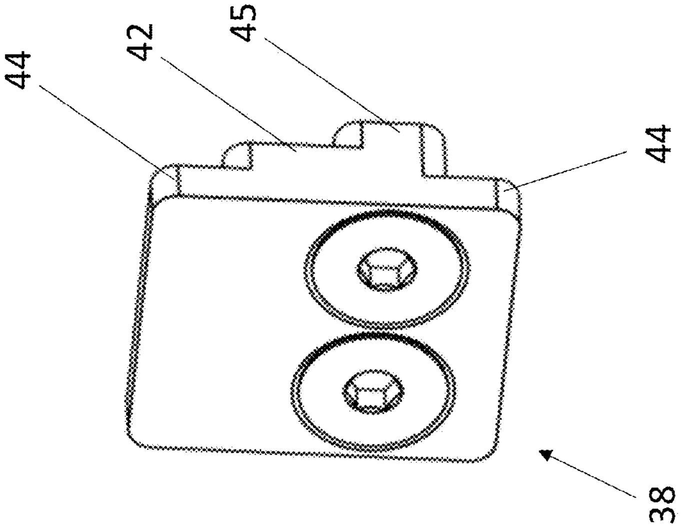

In this embodiment, the adapter plate 20 includes a pair of connector holes 48 spaced from one another across the surface of the adapter plate. More particularly, the connector holes 48 are aligned with one another to enable adjustment of the support plate relative to the adapter in a second axial direction. Preferably, the second axial direction is different (e.g., transverse) than the first axial direction. For example, in this embodiment, the second axial direction is perpendicular to the first axial direction. As seen in FIGS. 8 and 9, the connector-receiving openings can enable horizontal adjustments of the support plate, while the connector holes can enable vertical adjustments of the support plate. However, it is appreciated that other configurations are possible, such as providing additional connector holes at various different locations to allow greater adjustments or indexation of the support plate relative to the adapter plate and/or the ski.

It should be noted that, as used herein, the expression "indexation" (and alternatives thereto) can refer to the ability of adjusting the relative position between two components, such as between the support plate and the adapter plate. The indexation of the support plate relative to the adapter plate and/or the ski therefore corresponds to a system (e.g., the combination of connector holes and connector-receiving openings) which enables the position of the support plate to be changed or adjusted relative to the adapter plate and/or the ski. For instance, the combination of connector holes and connector-receiving openings can define an index matrix of possible positions for connecting the support plate to the adapter plate. The index matrix therefore provides a number of predetermined positions which can be chosen to have the support plate, and thus the actuator and the wheel, be in a desired position relative to the adapter plate and the ski. This can be useful for having the wheel be at a desired distance from the ground surface, for instance, when operating the actuating system in the idle configuration. It is noted that different wheels and skis have respective dimensions. Therefore, it can be useful or required to adjust a position of the wheel (e.g., relative to the ski and/or the ground surface) in order to improve functionality of the actuating system.

In some embodiments, when the support plate is connected to the adapter plate via the connector 38 extending through a desired connector-receiving opening 37 and connector hole 48, the support plate 32 can be further secured in position via one or more locator pins 60. The locator pins 60 can extend through the support plate to engage the adapter plate 20 to define at least a second connection point (e.g., the connector 38 defining the first connection point). It is thus noted that providing at least two connection points blocks rotation of the support plate relative to the adapter plate, therefore securing the support plate in place on the adapter plate. In this embodiment, the support plate 32 can be adapted to have a pair of locator pins 60 extend therethrough, thereby defining the second connection point and a third connection point.

As seen in FIGS. 5 and 8, in this embodiment, the second and third connection points are illustratively provided on opposite sides of the opening 37, although it is appreciated that other configurations are possible. It is also noted that, for each locator pin 60, a plurality of pin holes 62 are defined through the support plate. More specifically, a pin hole is defined for each combination of connector-receiving opening 37 and connector hole 48. For instance, in the illustrated embodiment, there are three (3) connector-receiving openings and two (2) connector holes 48, for a total of six (6) possible combinations for connecting the support plate to the adapter plate. Therefore, each locator pin 60 can extend through a corresponding one of six (6) pin holes 62 for securing the support plate in place. It should be noted that at least one pin hole per locator pin is adapted to be aligned with a corresponding pin-receiving hole 64 defined on the adapter plate.

The shape, size and location of the cut-out section 36, the opening 37, the connector holes 48, the locator pins 60, pin holes 62, pin-receiving-holes 64 and of the connector 38 itself can improve portability and security of the actuating assembly 30 across various ski designs since adjustments to the position of the actuating assembly 30 relative to the ski 5 can be made. In other words, fine-tuning of the position of the actuating assembly 30 can be made to account for specific brand/type of skis, suspension adjustment and/or pre-loading, presence of ski stoppers, presence of a passenger, presence of a wear bar, and the like. It should also be understood that various other methods of removably connecting the support plate 32 of the actuating assembly 30 to the ski 5 can be contemplated without departing from the current disclosure. For example, the adapter plate can be removed, with the bolt 46 being adapted to secure the actuating assembly (e.g., the support plate) directly to the ski 5. It is thus noted that the support plate can, in some embodiments, integrate the functionality of the adapter plate described above.

As previously discussed, and with reference to FIGS. 1 to 4B, a wheel 50 is coupled to the actuator 34 such that, when the actuating assembly 30 is operated in the engaged configuration, the wheel is positionable in a lowered position in engagement with the ground surface, and when the actuating assembly 30 is in the idle configuration, the wheel 50 is positioned in a raised position, spaced from a ground surface. It should be understood that various types of wheels may be coupled to the actuator 34, such as rubber tires or polyurethane wheels, for example. Further, other types of accessories may be coupled to the actuating assembly 30 instead of a wheel, such as an ice scraper/scratcher, a tow bar, etc. It is also appreciated that the wheel system can include a fixed accessory, such as a fixed wheel (e.g., instead of the retractable wheel described herein) configured to remain in engagement with the ground surface, for example.

The wheel system shown in the exemplary embodiment of FIGS. 1 through 9 corresponds to a right-side wheel system adapted to be installed on a right-side ski 5. In other words, the adapter plate 20 and the actuating assembly 30 are both adapted to be secured to the right-side ski 5. In some embodiments, right-side and left-side wheel systems will be attached to right and left skis of a snowmobile, respectively. The left-side actuating assembly may be a mirror of the right-side assembly 30, and the left-side adapter plate may be a mirror of the right-side adapter plate 20. While the right-side and left-side actuating assemblies may be ski-agnostic (e.g., not made for a specific type or brand of ski), the right-side and left-side adapter plates can be specifically designed for a type and/or brand of skis, for example. In a typical configuration, a pair of left and right wheel assemblies are installed on left and right skis of the snowmobile, such that when the left-side and right-side actuating assemblies are operated in the engaged configuration, left-side and right-side wheels of the actuating assemblies are positioned in contact with the ground, and the skis are lifted from the ground surface.

In one embodiment, the adapter plate 20, the support plate 32 and the connecting element 38 are made of machined metal. However, it will be understood that these elements can be made from any other material allowing for supporting the weight associated with lifting the front-end of a snowmobile. Broadly referring to FIGS. 1 to 19, the components of the wheel system 10 can be provided with recessed, cut, indented or otherwise removed sections. The removed sections can assist in reducing the weight of the various components of the wheel system, reduce the overall material required to manufacture these components, which can improve (e.g., reduce) manufacturing time and increase the overall ergonomic features of the components (e.g., improve maneuverability/handling of these components).

It should be appreciated from the disclosure above that the wheel system offers improvements over known systems and assemblies. For instance, the use of a support plate and of an adapter plate for coupling the actuating assembly to the ski facilitates connection and disconnection of the actuating assembly to and from the ski when needed or when desired. Further, the configuration of the connector and associated parts (e.g., pins, etc.) allows for adjusting the position of the actuating assembly relative to the adapter plate in at least a first and a second direction. Therefore, the position of the wheel relative to the ski can also be adjusted, thereby improving versatility/universality of the wheel system relative to various ski types and/or brands.

With reference to FIGS. 10 to 15, an alternate embodiment of the wheel system is shown. In this embodiment, the connecting element 38 includes a body portion 42 adapted to extend through the opening 37. The body portion includes a pair of overhanging portions 44 extending from thereof configured to engage complementarily shaped rabbeted edges 40 of the cut-out section 36. In the illustrated embodiment, the overganging portions 44 extend from opposite sides of the body portion, although other configurations are possible. The overhanging portions 44 are adapted to engage the pair of rabbeted edges 40 in order to wedge the support plate 32 between the connecting element 38 and the adapter plate 20 (e.g., when the connecting element 38 is secured to the adapter plate 20). It will be understood that, in this embodiment, the connecting element 38 is held through the opening 37 by the engagement between the rabbeted edges 40 and the overhanging portions 44, and only the body portion 42 of the connection element 38 extends through the opening 37. However, it will be appreciated that any other suitable configurations or methods of retaining the connecting element 38 engaged with the support plate 32 may be contemplated and are possible.

In some embodiments, the body portion 42 of the connecting element 38 also includes a protruding member 45 extending therefrom proximate an edge of the body portion 42. More particularly, the protruding member 45 is adapted to extend toward the adapter plate 20 when the connecting element 38 engages the cut-out section 36 and/or is inserted through the opening 37. A connector slot 48 is defined on or through the adapter plate 20 for receiving the connecting element 38. In this embodiment, the connector slot 48 has a shape complementing that of the connecting element 38, or at least of the protruding member 45. Therefore, the body portion 42 of the connecting element 38 can be adapted to abut on an outer surface of the adapter plate, and the protruding member 45 can engage or "mate" with the connector slot 48. The combination of the protruding member 45 and the recessed connector slot 48 defines a more secure connection between the connecting element 38 to the adapter plate 20.

The connecting element 38 is provided with a securing mechanism 43 for coupling with the connection slot 48 of the adapter plate 20. In other words, the securing mechanism enables securing the actuating assembly 30 to the adapter plate 20 via the connecting element 38. In some embodiments, the securing mechanism 43 extends from the protruding member 45 and can be connected to the connector slot 48. The securing mechanism 43 may include one or more screws, for example, and the connector slot 48 may be provided with one or more threaded holes adapted to receive the one or more screws. It will be appreciated that various other securing mechanisms may be used, such as latches or clips, and that the securing mechanism may be provided on the adapter plate 20 instead of the connecting element 38, for example.

Still referring to FIGS. 10 to 14, in this embodiment, the protruding member 45 extends from the body portion 42 proximate an edge of the body portion 42. In other words, the protruding member 45 is not centered relative to the body portion 42, but is rather aligned with or extends along an edge of the body portion 42. The shape and configuration of the connecting element 38 allows for connecting said connecting element with the adapter plate 20 in at least two different configurations. In a first configuration, the connecting element 38 engages the cut-out section 36 with the protruding member 45 positioned proximate a bottom half of the body portion 42. More specifically, the protruding member 45 extends along a lower edge of the body portion 42. In a second configuration, the connecting element 38 is rotated upside down, thereby positioning the protruding member 45 on an upper half of the body portion (e.g., along an upper edge thereof).

These two different configurations enable adjustment of the position of the support plate 32 relative to the adapter plate 20, and therefore of the actuating assembly relative to the ski 5. The adjustment of the support plate can correspond to a vertical adjustment, such as a height adjustment of the support plate 32 relative to the adapter plate 20. It should be understood that in the first configuration, the support plate 32 is secured with the adapter plate 20 at a first height relative to the adapter plate 20, while in the second configuration, the support plate 32 is secured at a second height different from the first height. The height difference can correspond to a distance between the protruding member 45 and an opposite side of the body portion 42. This allows for adjusting the height of the wheel relative to the ski 5, which can improve compatibility of the actuating assembly with different ski brands/types.

Figure 14:
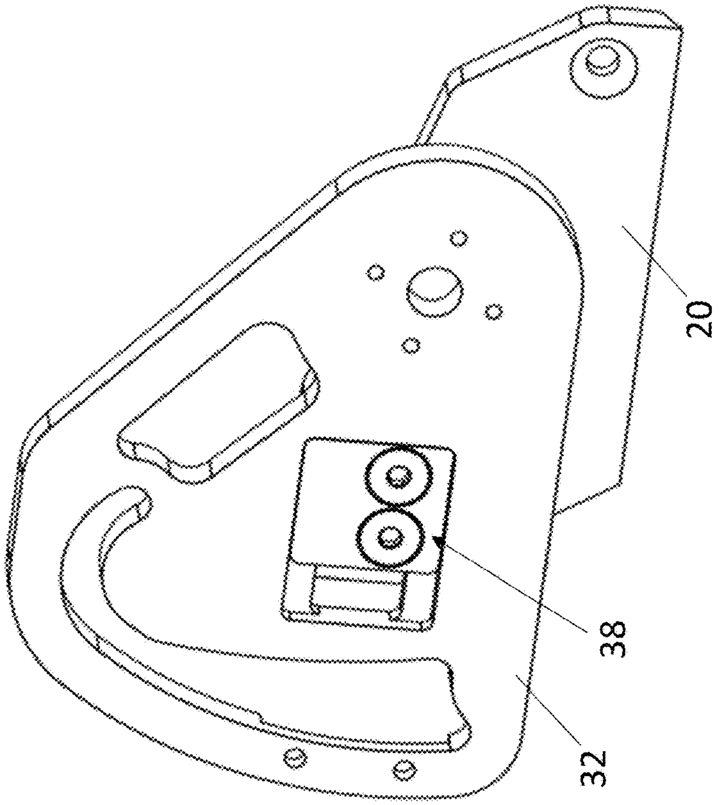
FIGS. 13 and 14 are perspective view of the actuating assembly shown in FIG. 10, showing the support plate connected to the adapter plate in different configurations.
Figure 13:
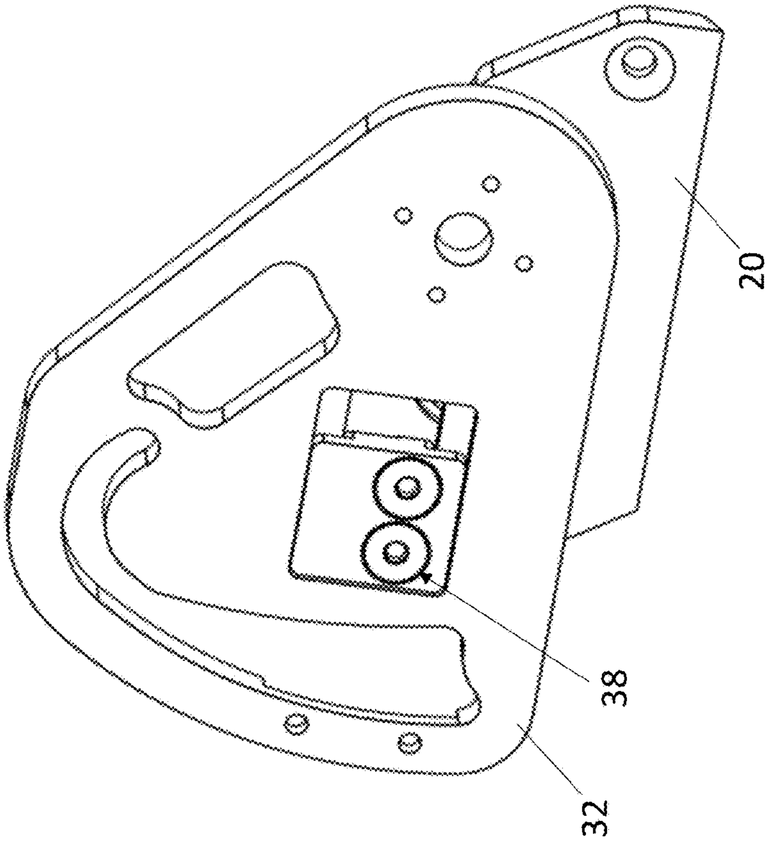
Figure 15:
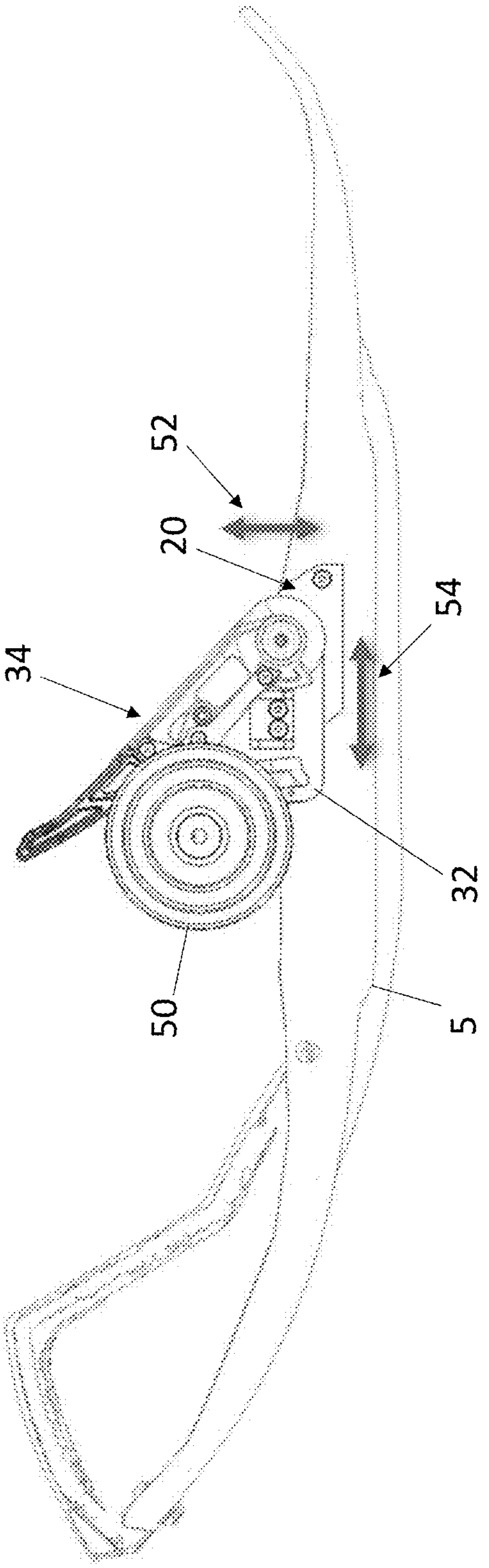
FIG. 15 is a side view of the actuating assembly of FIG. 10 coupled to a ski, showing possible adjustments to be made to the position of the support plate relative to the adapter plate.
Figure 16:
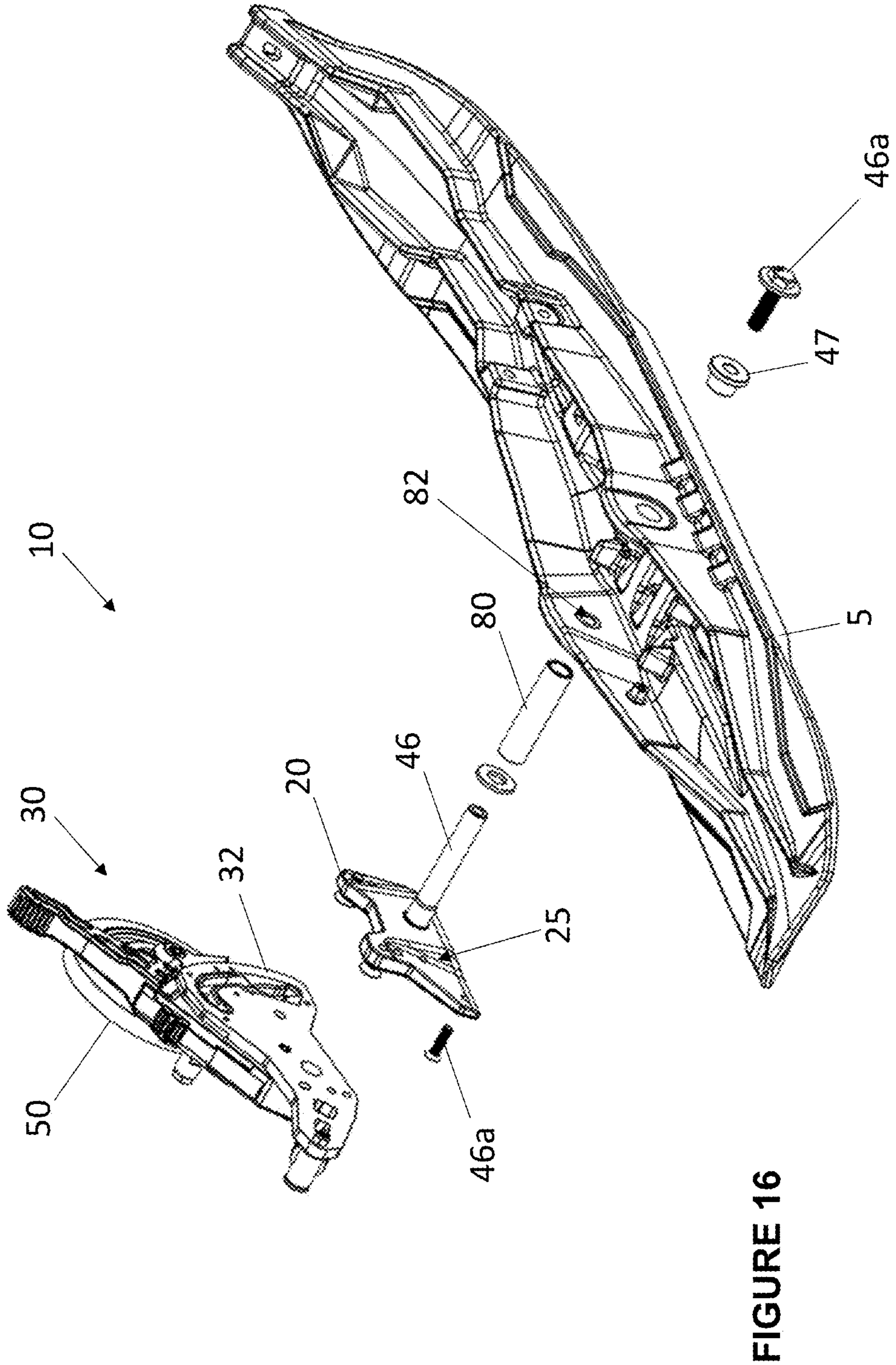
FIG. 16 is an exploded perspective view of an alternate embodiment of the wheel system connectable to a snowmobile ski.
Figure 18:
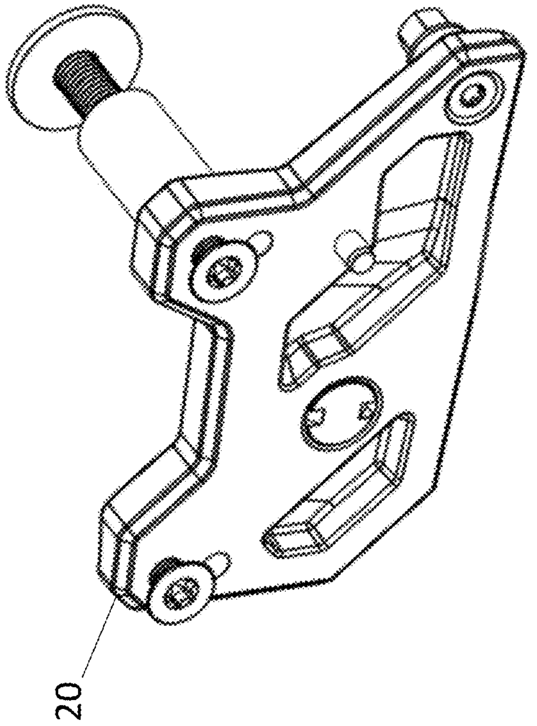
FIGS. 17 and 18 are perspective views of the adapter plate of the wheel system shown in FIG. 16, showing the adapter plate provided with an integrated bolt, according to an embodiment.

With reference to FIGS. 13 to 15, the cut-out section 36 may be shaped and sized such that the connecting element 38 can be moved in at least one direction within the opening 37, providing a second adjustment of the support plate relative to the adapter plate 20. The cut-out section 36 can be provided with a longer length in the direction of the rabbeted edges 40 than a length of the connecting element 38. Therefore, the overhanging portions 44 of the connecting element 38 can be adapted to slide along the rabbeted edges 40 prior to securing the connecting element 38 in place. The second adjustment generally corresponds to a horizontal adjustment of the position of the support plate relative to the adapter plate, and thus corresponds to a horizontal adjustment of the wheel relative to the ski 5. It will be appreciated that the first adjustment of the wheel 50 relative to the ski 5 may be different from the second adjustment. With reference to FIG. 15, the first adjustment corresponds to adjusting the position of the actuating assembly 30 in a vertical direction 52, while the second adjustment corresponds to adjusting the position of the actuating assembly 30 in a horizontal direction 54. However, in alternative embodiments, both first and second adjustments may be additive such that the range of adjustment in one particular direction is improved, for example.

In some embodiments, the cut-out section 36 may include only one rabbeted edge extending along one side of the opening 37. Correspondingly, the connecting element 38 may include only one overhanging portion 44 that extends on one side of the body portion 42 such as to match the rabbeted edge. However, it is appreciated that other configurations of the cut-out section and/or of the connecting element are possible and may be used.

Now referring to FIGS. 16 to 19, another embodiment of the wheel system 10 is shown. In this embodiment, the adapter plate 20 and the fastener (e.g., the bolt 46) used to at least partially connect the adapter plate 20 to the ski 5 are integrally made. In other words, the adapter plate 20 and the bolt 36 are formed as a single piece. It should be noted that, as used herein, the expression "single piece" or "integral piece" refers to a part or piece which does not include interconnected and disconnectable parts forming a whole, but rather a single, monolithic part or piece. The single piece can have different portions, although the different portions cannot be disconnected from one another as they are part of the same monolithic structure. In some embodiments, the bolt 46 can be machine-pressed and soldered or welded onto the adapter plate 20, thereby creating an adapter plate with integrated fastener (e.g., a single and/or monolithic piece). In other embodiments, the bolt 46 can be integrally formed with the adapter plate by machining the attachment together with the adapter plate, molding the adapter plate with the integrated bolt or via an additive manufacturing process (e.g., 3D printing), for example. It is noted that providing an integrated fastener to the adapter plate can provide a more rigid assembly when connecting the adapter plate to the ski and also reduce the amount of time required to mount the adapter plate to the ski.

In this embodiment, it is appreciated that integrating the bolt with the adapter plate can negate the need for the fastener aperture 49 (FIG. 9) of the adapter plate and/or the bushing attachment 24 (FIG. 3), as described in relation to previous embodiments. Moreover, the integrated bolt 46 can be threaded along the shank, such as along an entire length thereof or only a portion thereof to enable a nut to be fastened thereto for securing the bolt 46 (and therefore the adapter plate) to the ski 5. The bolt 46 can be threaded along an outer surface thereof to cooperate with a nut, or along an inner surface thereof to enable an additional fastener **46*a* (e.g., a connector bolt) to be fastened therein. It is noted that, by having threads along a single end of the bolt 46 (e.g., the distal end 85**), the risk of accidentally unfastening a part of the assembly is reduced. For example, if the bolt was threaded at both ends thereof, movement of the assembly (e.g., vibrations) can cause unintentional loosening of one of the connected parts (e.g., the adapter plate, the bolt, the nut, the ski, etc.) relative to the other. In other cases, the bolt can be provided with threads at both ends, such as right-handed threads at a first end for connecting to the adapter plate, and left-handed threads at a second end for connecting to the ski or bushing. Therefore, when one of the ends of the bolt is to be fastened or loosened from the corresponding component, the opposite action can occur at the opposite end of the bolt (e.g., unbeknownst to the person performing the action). This may increase safety risks and/or cause durability issues of the assembly.

In some embodiments, the integrated bolt 46 can be provided with a sleeve 80 adapted to slide on the bolt (e.g., the shank thereof). The sleeve 80 is adapted to increase a thickness of the bolt 46, enabling the bolt to connect to a greater range of skis 5, such as skis having different-sized (e.g., bigger) bolt-receiving openings 82, for example. In other words, if a diameter of the bolt-receiving opening 82 is greater than a diameter of the bolt 46, a sleeve 80 can be installed on the bolt 46 to increase the diameter of the bolt to better fit in the bolt-receiving opening 82. It is appreciated that a plurality of sleeves 82 can be provided to enable increasing the diameter of the bolt to different sizes.

Figure 19:
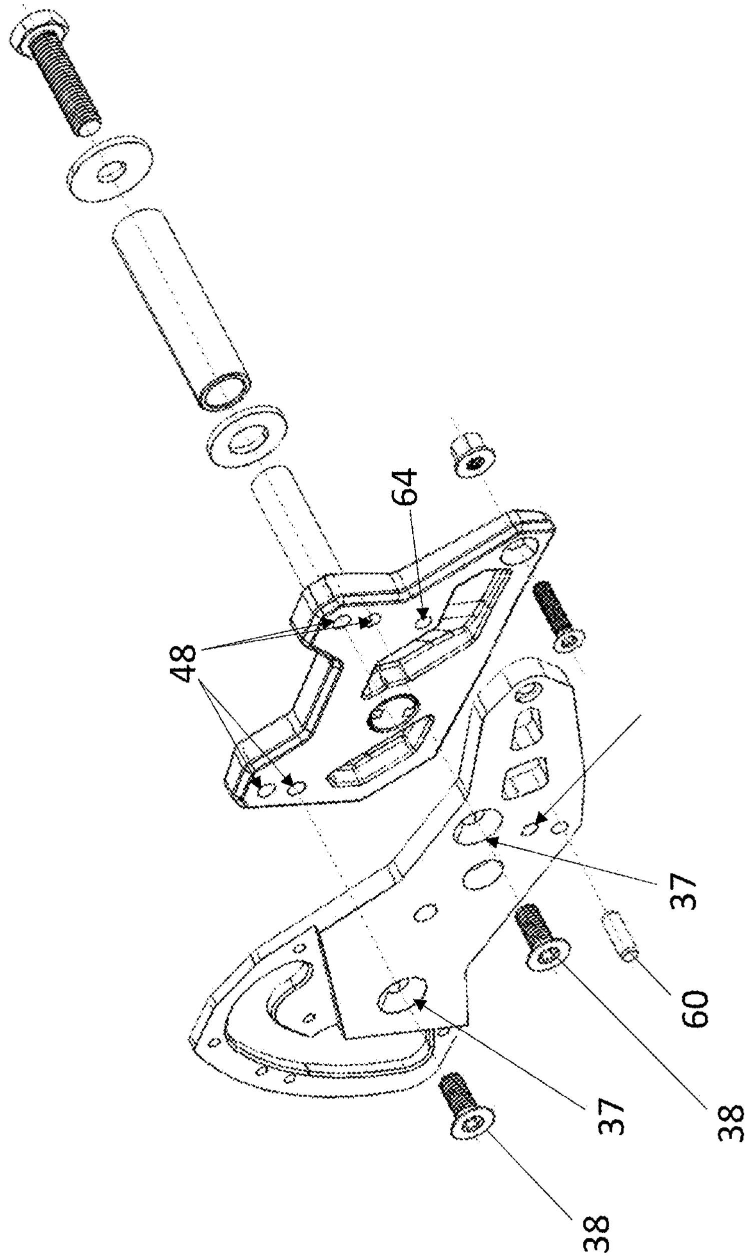
FIG. 19 is an exploded view of the support plate and the adapter plate of the wheel system shown in FIG. 16, showing various connectors for coupling the support plate and the adapter plate together, according to an embodiment.

Similar to previously described embodiments, the support plate 32 can be coupled to the adapter plate 20 in a plurality of positions. In the embodiment of FIGS. 16 to 19, the support plate 32 can include a pair of openings 37 configured to receive respective connectors 38 for connecting with the adapter plate 20. In this embodiment, each connector 38 can extend through the support plate 32 in a single location. In addition, the adapter plate 20 includes connector holes 48 configured to receive the connector 38 when fastening the support plate to the adapter plate. More specifically, the adapter plate 20 include two (2) separate groups of connector holes 48, where each group is adapted to cooperate with one of the openings 37 of the support plate 32. As seen in FIG. 19, each group of connector holes 48 can include a pair of connector holes 48 (for a total of four (4) connector holes). The relative position of the support plate 32 and the adapter plate can therefore be adjusted depending on the connector holes 48 chosen on the adapter plate 20. In other words, the combination of connector holes 48 and openings 37 enable indexation of the support plate on the adapter plate.

In this embodiment, the connector holes 48 of each group are aligned with one another to enable adjustment of the support plate relative to the adapter in a corresponding direction (e.g., a vertical direction). It should be appreciated that additional connector holes 48 can enable adjustments of the support plate relative to the adapter in additional directions (e.g., horizontal, diagonal, rotational, etc.). In some embodiments, the openings 37 and/or the connector holes 48 can have an elongated shape, thereby enabling adjustment of the relative position of the support plate and the adapter plate by sliding the connector 38 along the elongated shape, for example. The elongated shape can be straight (e.g., axial), arcuate or a combination thereof.

In some embodiments, the support plate 32 can be further secured in position via one or more locator pins 60. In this embodiment, the support-and-adapter plate assembly is further secured together via a single locator pin 60. The locator pin 60 can extend through the support plate to engage the adapter plate 20 and define an additional connection point. It is also noted that a plurality of pin holes 62 are defined through the support plate. This configuration ensures that one of the pin holes 62 is aligned with a pin-receiving hole 64 defined on the adapter plate whatever ones of the openings 37 is chosen to have the connectors 38 extend through.

Figure 17:
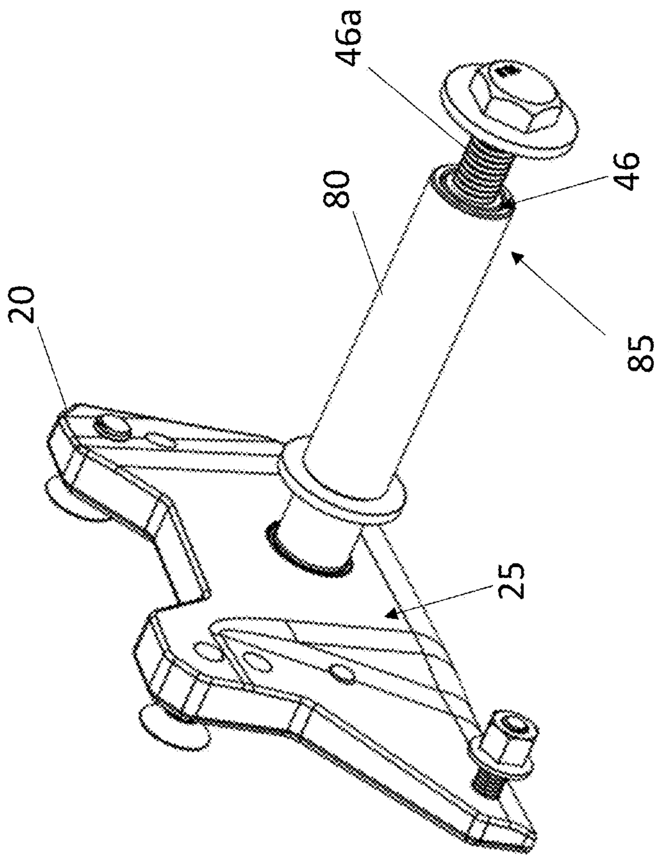

As seen in FIG. 3, the adapter plate 20 can have a substantially flat rear surface 25, i.e., the surface of the adapter plate 20 which faces the ski 5. Alternatively, and as seen in FIG. 17, the rear surface 25 can have a complementary shape relative to the ski, therefore increasing conformity of the adapter plate 20 with the ski, improving the connection therebetween and facilitating positioning the adapter plate onto the ski for securing the adapter plate thereto. It is noted that the rear surface 25 can be shaped and sized to conform to a particular brand and/or type of ski. Alternatively, the adapter plate 20 can be custom-made to have the rear surface 25 conform to a desired brand and/or type of ski.

The present disclosure may be embodied in other specific forms without departing from the subject matter of the claims. The described example embodiments are to be considered in all respects as being only illustrative and not restrictive. For example, the embodiments shown in the drawings and described herein include an adapter plate, it should be understood that in some alternative embodiments of the disclosure, the actuating assembly may be connected directly to the ski without using an adapter plate. Indeed, the connecting element may be secured directly to a ski, for example, or an adapted king pin may be provided instead of an adapter plate, as previously mentioned. In such embodiments, the actuating assembly may be removably secured directly to the ski.

The present disclosure intends to cover and embrace all suitable changes in technology. The scope of the present disclosure is, therefore, described by the appended claims rather than by the foregoing description. The scope of the claims should not be limited by the implementations set forth in the examples, but should be given the broadest interpretation consistent with the description as a whole.

As used herein, the terms "coupled", "coupling", "attached", "connected" or variants thereof as used herein can have several different meanings depending in the context in which these terms are used. For example, the terms coupled, coupling, connected or attached can have a mechanical connotation. For example, as used herein, the terms coupled, coupling or attached can indicate that two elements or devices are directly connected to one another or connected to one another through one or more intermediate elements or devices via a mechanical element depending on the particular context.

In the present disclosure, the same numerical references refer to similar elements. In addition, for the sake of simplicity and clarity, namely so as to not unduly burden the figures with several reference numbers, not all figures contain references to all the components and features shown, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Furthermore, although the various exemplary embodiments of the wheel system described herein may be used in relation with a snowmobile ski, it is understood that it may be used with other types of skis and/or for other purposes. For this reason, the term "ski" as used herein should not be taken as to limit the scope of the present disclosure as being used with snowmobile skis in particular. It should be understood that the term "ski" should, in the context of the present disclosure, encompass all other types of skis with which the described embodiments could be used and may be useful.

In addition, although the optional configurations as illustrated in the accompanying drawings comprise various components and although the optional configurations of the wheel system as shown may consist of certain configurations as explained and illustrated herein, not all of these components and configurations are essential and thus should not be taken in their restrictive sense, i.e., should not be taken as to limit the scope of the present disclosure. It is to be understood that other suitable components and cooperations thereinbetween, as well as other suitable configurations may be used for the wheel system and corresponding parts, as briefly explained, and as can be easily inferred herefrom, without departing from the scope of the disclosure.

The invention claimed is:

1. A wheel system for a snowmobile ski, comprising:
an adapter plate adapted to be secured to the ski;
an actuating assembly comprising:
a support plate removably securable to the adapter plate to enable selective connection and disconnection of the actuating assembly from the adapter plate and from the ski, the support plate being securable to the adapter plate in a predetermined position; and
an actuator pivotally connectable to the support plate and being pivotable relative to the support plate for operation of the actuator between an idle configuration and an engaged configuration, the support plate remaining secured in the predetermined position relative to the adapter plate during operation of the actuator between the idle configuration and the engaged configuration; and
a wheel coupled to the actuator and adapted to be positioned in a raised position spaced from a ground surface when operating the actuator in the idle configuration, and a lowered position in engagement with the ground surface when operating the actuator in the engaged configuration.

2. The wheel system of claim 1, wherein the support plate includes a cut-out section defining an opening through the support plate, and the adapter plate comprises a connector hole, and wherein the support plate is removably securable to the adapter plate via a connector adapted to extend through the opening and engage the connector hole.

3. The wheel system of claim 2, wherein the adapter plate comprises at least two connector holes, and wherein the support plate is securable to the adapter plate in different predetermined positions spaced in a first direction, the different predetermined positions being defined by aligning the opening of the cut-out section with any one of the at least two connector holes.

4. The wheel system of claim 3, wherein the opening defines a plurality of connector-receiving openings, and wherein the support plate is securable to the adapter plate in additional predetermined positions spaced in a second direction, the additional predetermined positions being defined by aligning any one of the plurality of connector-receiving openings with any one of the at least two connector holes.

5. The wheel system of claim 4, wherein the first direction and the second direction are transverse relative to one another.

6. The wheel system of claim 4, wherein the support plate is securable to the adapter plate in a plurality of predetermined positions, and wherein a number of predetermined positions corresponds to a number of combinations for aligning one of the plurality of connector-receiving openings with one of the at least two connector holes.

7. The wheel system of claim 2, wherein the connector is configured to define a first connection point, and wherein the wheel system further comprises a secondary connector configured to further secure the support plate to the adapter plate and define a second connection point spaced from the first connection point.

8. The wheel system of claim 1, wherein the ski is coupled to the snowmobile via a bolt, and wherein the adapter plate is securable to the ski at least via the bolt.

9. The wheel system of claim 1, wherein the adapter plate is a left-side adapter plate adapted to be secured to a left-side ski of the snowmobile, and the actuating assembly is a left-side actuating assembly removably connectable to the left-side adapter plate, and wherein the wheel system further comprises:
a right-side adapter plate adapted to be secured to a right-side ski of the snowmobile; and
a right-side actuating assembly removably connectable to the right-side adapter plate.

10. A wheel system for a snowmobile ski, comprising:
an adapter plate adapted to be secured to the ski;
an actuating assembly comprising:
a support plate securable to the adapter plate via a connecting element to enable securing the support plate to the adapter plate in a desired one of a plurality of predetermined positions; and
an actuator pivotally connectable to the support plate and being pivotable relative to the support plate for operation thereof between an idle configuration and an engaged configuration, the support plate remaining secured in the desired one of the plurality of predetermined positions during operation of the actuator between the idle configuration and the engaged configuration; and
a wheel coupled to the actuator and adapted to be positioned in a raised position spaced from a ground surface when operating the actuator in the idle configuration, and a lowered position in engagement with the ground surface when operating the actuator in the engaged configuration, wherein each predetermined position of the support plate relative to the adapter plate defines respective positions of the actuator and the wheel relative to the adapter plate and the ski.

11. The wheel system of claim 10, wherein the support plate is removably connectable to the adapter plate to enable selective connection and disconnection of the actuating assembly from the adapter plate and the ski.

12. The wheel system of claim 10, wherein the connecting element comprises one or more fasteners adapted to extend through the support plate and engage the adapter plate to secure the support plate to the adapter plate in the desired one of the plurality of predetermined positions.

13. The wheel system of claim 12, wherein adjusting relative positions between the support plate and the adapter plate correspondingly adjusts a distance between the wheel and the ground surface, and wherein the desired one of the plurality of predetermined positions of the support plate includes a desired distance between the wheel and the ground surface.

14. The wheel system of claim 10, wherein the support plate comprises one or more fastener holes and the adapter plate comprises one or more fastener-receiving holes, and wherein the support plate is indexable relative to the adapter plate between the plurality of predetermined positions via alignment of any one of the one or more fastener holes with any one of the one or more fastener-receiving holes.

15. The wheel system of claim 10, wherein the ski is coupled to the snowmobile via a bolt, and wherein the adapter plate is securable to the ski at least via the bolt.

16. The wheel system of claim 10, where in the adapter plate and the bolt are integrally formed as a single piece removably connectable to the ski.

17. A wheel system for a snowmobile ski of a snowmobile, comprising:
an adapter plate adapted to be secured to the ski;
an actuating assembly comprising:
a support member connectable to the adapter plate; and
an actuator pivotally connectable to the support member and being operable between an idle configuration and an engaged configuration, the support member remaining connected and static relative to the adapter plate during operation of the actuator between the idle configuration and the engaged configuration; and a wheel coupled to the actuator and adapted to be positioned in a raised position spaced from a ground surface when operating the actuator in the idle configuration, and a lowered position in engagement with the ground surface when operating the actuator in the engaged configuration, wherein the snowmobile ski is connected to the snowmobile via a bolt, and wherein the bolt and the adapter plate are integrally formed as a single piece.

18. The wheel system of claim 17, further comprising a sleeve removably slidable onto the bolt to increase an outer diameter thereof.

19. The wheel system of claim 17, wherein the adapter plate has a rear surface with at least a portion thereof being complementarily-shaped relative to outer contours of the ski to increase conformity of the adapter plate to the ski.

20. The wheel system of claim 17, wherein the support member is securable to the adapter plate in a plurality of predetermined positions, and wherein each one of the plurality of predetermined positions provides a unique position of the wheel relative to at least one of the adapter plate, the snowmobile ski and the ground surface in both the raised position and the lowered position.

* * * * *